(12) United States Patent
Takeuchi

(10) Patent No.: US 11,210,749 B2
(45) Date of Patent: Dec. 28, 2021

(54) POWER MANAGEMENT APPARATUS, POWER MANAGEMENT SYSTEM, POWER MANAGEMENT METHOD, AND NON-TRANSITORY STORAGE MEDIUM

(71) Applicant: NEC Corporation, Tokyo (JP)

(72) Inventor: Hiroki Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 54 days.

(21) Appl. No.: 16/463,152

(22) PCT Filed: Jun. 21, 2017

(86) PCT No.: PCT/JP2017/022803
§ 371 (c)(1),
(2) Date: May 22, 2019

(87) PCT Pub. No.: WO2018/105154
PCT Pub. Date: Jun. 14, 2018

(65) Prior Publication Data
US 2019/0279315 A1    Sep. 12, 2019

(30) Foreign Application Priority Data
Dec. 5, 2016    (JP) .............................. JP2016-235849

(51) Int. Cl.
*G06Q 50/06*    (2012.01)
*H02J 3/14*    (2006.01)
(Continued)

(52) U.S. Cl.
CPC ............... *G06Q 50/06* (2013.01); *H02J 3/00* (2013.01); *H02J 3/14* (2013.01); *H02J 3/32* (2013.01);
(Continued)

(58) Field of Classification Search
CPC .... G06Q 50/06; H02J 3/00; H02J 3/14; H02J 3/32; H02J 2310/12; Y04S 20/222; Y04S 50/10; Y02B 70/3225
See application file for complete search history.

(56) References Cited

U.S. PATENT DOCUMENTS

| | | | |
|---|---|---|---|
| 2004/0143540 A1* | 7/2004 | Song | G06Q 30/08 705/37 |
| 2008/0114499 A1* | 5/2008 | Hakim | G06Q 50/06 700/291 |

(Continued)

FOREIGN PATENT DOCUMENTS

| | | |
|---|---|---|
| JP | 2002-271982 A | 9/2002 |
| JP | 2003-299248 A | 10/2003 |

(Continued)

OTHER PUBLICATIONS

International Search Report corresponding to PCT/JP2017/022803, dated Sep. 12, 2017 (3 pages).

*Primary Examiner* — Thomas C Lee
*Assistant Examiner* — Michael Tang

(57) ABSTRACT

The present invention provides a power management apparatus (10) including a request acquisition unit (12) that acquires a power consumption request specifying a power amount to be consumed, a time period during which power is consumed, and a power sales price P, a consumer information acquisition unit (11) that acquires consumer information including a power sales price for each time period of a power retailer selling power to each of a plurality of power consumers and specification information of a power storage system of each of the plurality of power consumers, and a determination unit (13) that determines a charging and discharging schedule of the power storage system of each
(Continued)

power consumer on the basis of the consumer information and the power consumption request.

20 Claims, 8 Drawing Sheets

(51) Int. Cl.
*H02J 3/32* (2006.01)
*H02J 3/00* (2006.01)
(52) U.S. Cl.
CPC .......... *Y02B 70/3225* (2013.01); *Y04S 20/222* (2013.01)

(56) References Cited

U.S. PATENT DOCUMENTS

| | | | | |
|---|---|---|---|---|
| 2009/0164383 A1* | 6/2009 | Rothman | ........... | G06Q 30/0206 705/80 |
| 2011/0055036 A1* | 3/2011 | Helfan | ................. | G06Q 50/06 705/26.1 |
| 2013/0069659 A1* | 3/2013 | Iwasaki | ................. | G01R 31/382 324/426 |
| 2013/0274938 A1* | 10/2013 | Ahn | .................. | H02J 13/00034 700/291 |
| 2014/0279361 A1* | 9/2014 | Streeter | .................. | G06Q 50/06 705/37 |
| 2015/0170080 A1* | 6/2015 | Kaushik | ................. | G06Q 10/04 705/7.22 |
| 2015/0309549 A1* | 10/2015 | Okabe | .................... | G06Q 10/04 713/330 |
| 2016/0141873 A1* | 5/2016 | Ellice-Flint | ............. | H02J 3/387 307/20 |
| 2016/0368396 A1* | 12/2016 | Konet | ................. | B60L 15/2045 |
| 2017/0358929 A1* | 12/2017 | Koeppe | ............. | H02J 13/00028 |

FOREIGN PATENT DOCUMENTS

| | | | |
|---|---|---|---|
| JP | 2014-002425 A | | 1/2014 |
| JP | 2015050783 A | * | 3/2015 |

* cited by examiner

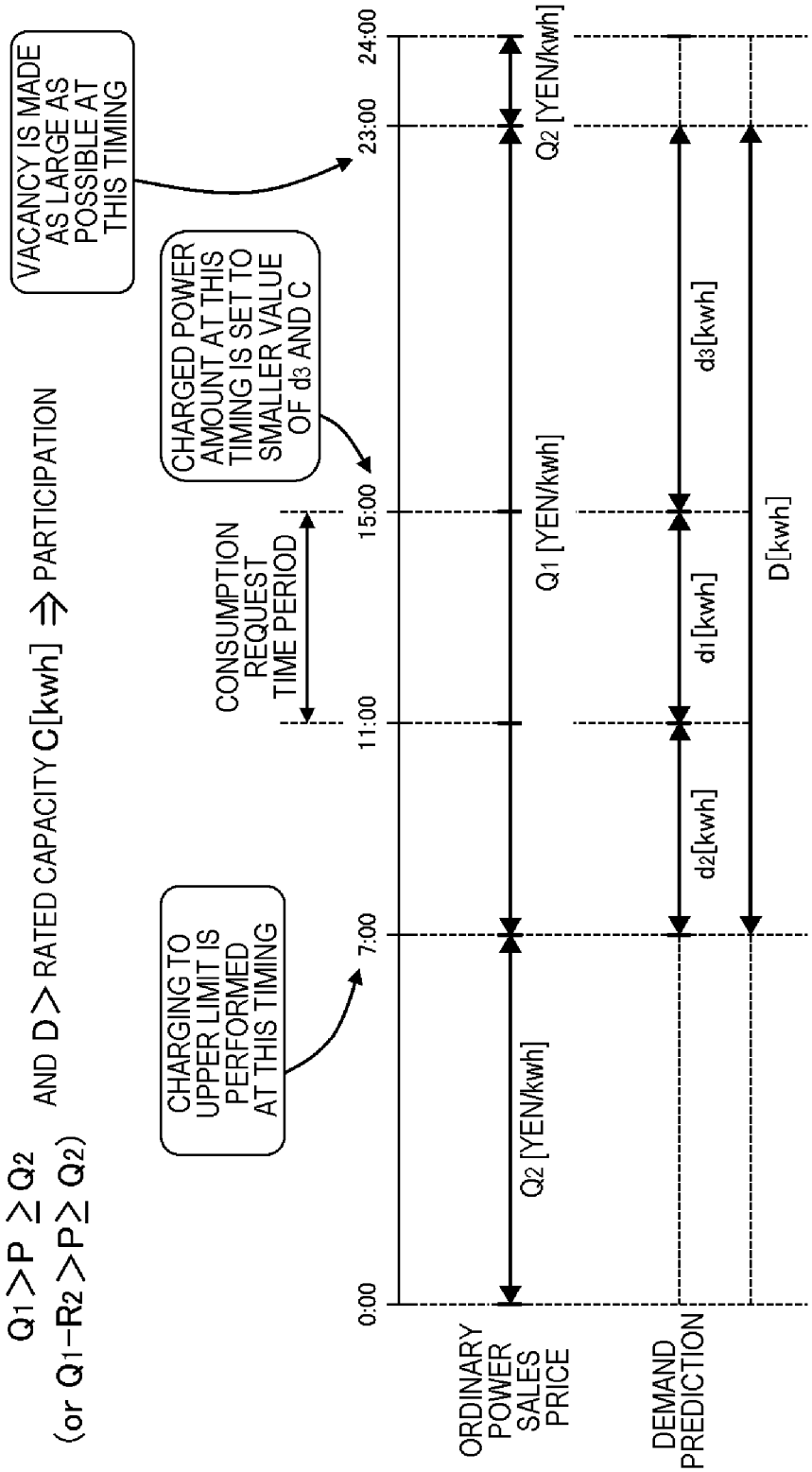

FIG. 7

CHARGED POWER AMOUNT M AT 11:00 = C - d2 [kwh]  (C > d2) or 0 [kwh]

TARGET POWER AMOUNT AT 15:00 IS SMALLER VALUE OF d3 [kwh] AND C [kwh]

☆ WHEN M = 0: POWER STORAGE SYSTEM IS CAUSED TO BE CHARGED WITH SMALLEST POWER AMOUNT OF d3, S, AND X

DETERMINE TO CAUSE SUM OF POWER AMOUNT TO BE CHARGED AND d1 TO BE CONSUMED

☆ WHEN M = C - d2 AND C - d2 > d3:  CAUSE POWER STORAGE SYSTEM TO DISCHARGE (C - d2) - d3

DETERMINE TO CAUSE d1 - {(C - d2) - d3} TO BE CONSUMED

☆ WHEN M = C - d2 AND d3 ≥ C - d2:  POWER STORAGE SYSTEM IS CAUSED TO BE CHARGED WITH SMALLEST POWER AMOUNT OF d3 - (C - d2), d2, AND X

DETERMINE TO CAUSE SUM OF POWER AMOUNT TO BE CHARGED AND d1 TO BE CONSUMED

POWER MANAGEMENT APPARATUS, POWER MANAGEMENT SYSTEM, POWER MANAGEMENT METHOD, AND NON-TRANSITORY STORAGE MEDIUM

CROSS-REFERENCE TO RELATED APPLICATIONS

This application is a national stage application of International Application No. PCT/JP2017/022803 entitled "POWER MANAGEMENT APPARATUS, POWER MANAGEMENT SYSTEM, POWER MANAGEMENT METHOD, AND PROGRAM," filed on Jun. 21, 2017, which claims priority to Japanese Patent Application No. 2016-235849, filed on Dec. 5, 2016, the disclosures of each of which are hereby incorporated by reference in their entirety.

TECHNICAL FIELD

The present invention relates to a power management apparatus, a power management system, a power management method, and a program.

BACKGROUND ART

Patent Document 1 discloses a surplus power management system in which a power supplier purchases surplus power of a power producer and supplies the purchased power directly from the power producer to a power user through a power transmission network. The surplus power management system includes an estimation unit that estimates power demand of the power user, a determination unit that determines a power generation plan for transmitting power equivalent to the estimated power demand from the power producer to the power transmission network, and a notification unit that notifies the power producer of the determined power generation plan.

On the other hand, in order to adjust demand and supply balance of power, a command to suppress power output may be notified from a power transmission and distribution service provider managing the power transmission network to the power producer. Accordingly, means for avoiding output suppression by having a power consumer consume a power amount equivalent to the output to be suppressed has been examined.

For example, an apparatus or the like on the power consumer side is controlled according to a power consumption request from the power producer to consume power equivalent to a requested amount from the power producer (example: a power storage system of the power consumer is charged with a predetermined power amount).

RELATED DOCUMENT

Patent Document

[Patent Document 1] Japanese Unexamined Patent Publication No. 2002-271982

SUMMARY OF THE INVENTION

Technical Problem

When an advantage of consuming power according to the request from the power producer is insignificant, power consumers participating in the service cannot be sufficiently secured. Thus, there is a problem that it is not possible to appropriately determine a control content of the power consumer side when power is consumed by the power consumer according to the power consumption request from the power producer.

Solution to Problem

According to the invention, there is provided a power management apparatus including a request acquisition unit that acquires a power consumption request specifying a power amount to be consumed, a time period during which power is consumed, and a power sales price P, a consumer information acquisition unit that acquires consumer information including a power sales price for each time period of a power retailer selling power to each of a plurality of power consumers and specification information of a power storage system of each of the plurality of power consumers, and a determination unit that determines a charging and discharging schedule of the power storage system of each power consumer on the basis of the consumer information and the power consumption request.

According to the invention, there is provided a power management system including the power management apparatus, and a power storage system that operates on the basis of an instruction from the power management apparatus.

According to the invention, there is provided a power management method executed by a computer, the method including a request acquisition step of acquiring a power consumption request specifying a power amount to be consumed, a time period during which power is consumed, and a power sales price P, a consumer information acquisition step of acquiring consumer information including a power sales price for each time period of a power retailer selling power to each of a plurality of power consumers and specification information of a power storage system of each of the plurality of power consumers, and a determination step of determining a charging and discharging schedule of the power storage system of each power consumer on the basis of the consumer information and the power consumption request.

According to the invention, there is provided a program causing a computer to function as a request acquisition unit that acquires a power consumption request specifying a power amount to be consumed, a time period during which power is consumed, and a power sales price P, a consumer information acquisition unit that acquires consumer information including a power sales price for each time period of a power retailer selling power to each of a plurality of power consumers and specification information of a power storage system of each of the plurality of power consumers, and a determination unit that determines a charging and discharging schedule of the power storage system of each power consumer on the basis of the consumer information and the power consumption request.

Advantageous Effects of Invention

According to the invention, it is possible to appropriately determine a control content on a power consumer side in a technique for having a power consumer consume power according to a power consumption request from a power producer.

BRIEF DESCRIPTION OF THE DRAWINGS

The above and other objects, features, and advantages will be apparent from preferred example embodiments described below and the following accompanying drawings.

FIG. 6 is a diagram illustrating an example of processing of the determination unit of the example embodiment.

FIG. 7 is a diagram illustrating an example of processing of the determination unit of the example embodiment.

DESCRIPTION OF EMBODIMENTS

Figure 1:
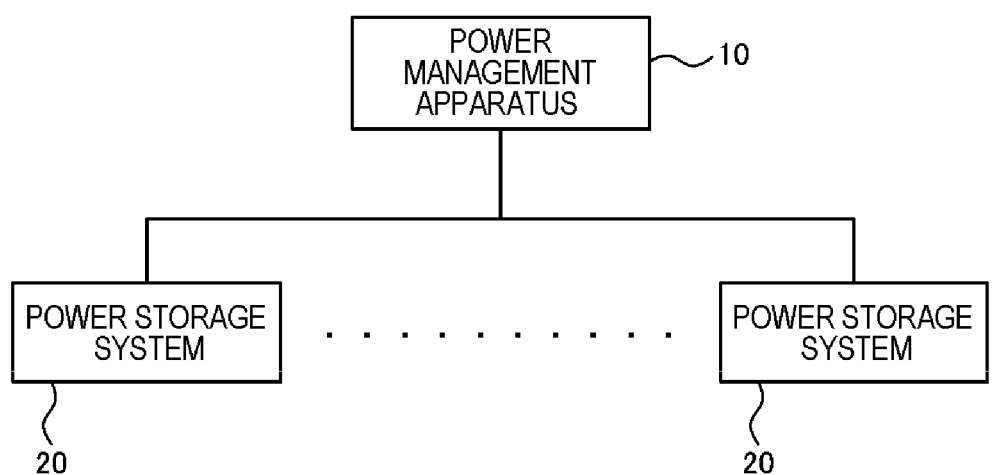
FIG. 1 is an example of a functional block diagram of a power management system of an example embodiment.

FIG. 1 is an example of a functional block diagram of a power management system of an example embodiment. As illustrated in the drawing, the power management system includes a power management apparatus 10 and a plurality of power storage systems 20.

The power management apparatus 10 is managed by a provider (hereinafter, referred to as an "aggregator") that provides a service for having a power consumer consume power according to a power consumption request from a power producer. The power storage systems 20 are managed by power consumers. The power management apparatus 10 and the power storage systems 20 are connected to each other through a communication network, such as the Internet, and perform transmission and reception of information with each other.

Figure 2:
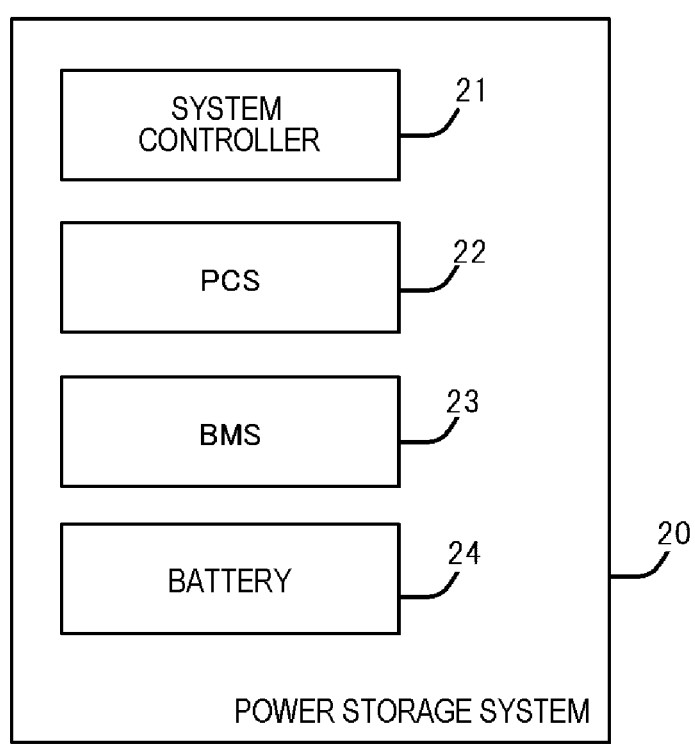
FIG. 2 is an example of a functional block diagram of a power storage system of the example embodiment.

FIG. 2 illustrates a configuration example of the power storage system 20. The power storage system 20 includes, for example, a system controller 21, a power conditioning system (PCS) 22, a battery management system (BMS) 23, and a battery 24.

The system controller 21 controls the entre power storage system 20. The PCS 22 performs conversion of direct-current power/alternating-current power. The battery 24 stores power. The battery 24 includes, for example, a cell stack that stores energy, a battery monitor that monitors a cell temperature and a cell voltage, and the like. The BMS 23 controls the battery 24.

The power storage system 20 is subjected to charging and discharging control by the power management apparatus 10. That is, the power management apparatus 10 transmits control information (example: a charging and discharging schedule or the like) of a charging and discharging operation to the power storage system 20. The BMS 23 of the power storage system 20 controls an operation of the battery 24 in accordance with the control information. It should be noted that, although the power storage system 20 is subjected to charging and discharging control by the power management apparatus 10, contents, such as a state of charge (SOC), an output, and a time period, that may be controlled in the power management apparatus 10 may be appropriately set.

Next, the power management apparatus 10 will be described in detail. First, an example of the hardware configuration of the power management apparatus 10 of the example embodiment will be described. Functional units included in the power management apparatus 10 of the example embodiment are implemented by any combination of hardware and software centering on a central processing unit (CPU), a memory, a program loaded on the memory, a storage unit (capable of storing programs stored in advance at the time of shipment of the apparatus as well as programs downloaded from a storage medium, such as a compact disc (CD), or a server on the Internet), such as a hard disk that stores the program, and an interface for communication network connection of any computer. In addition, those skilled in the art can understand that various modification examples can be made to the implementation method and the apparatus.

Figure 3:
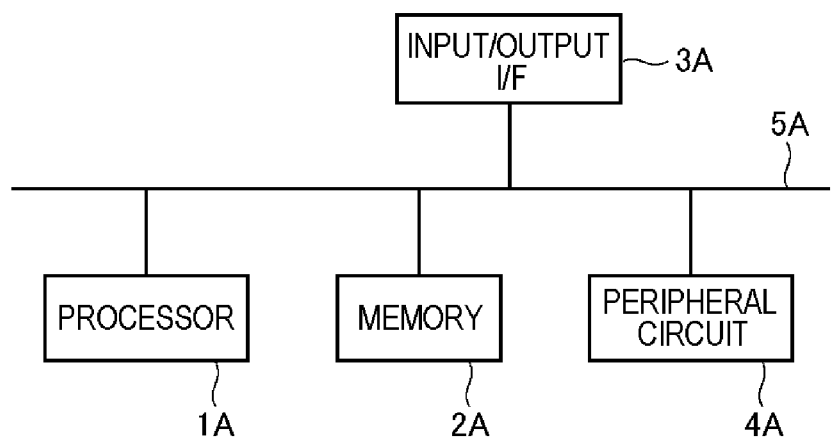
FIG. 3 is a diagram conceptually illustrating an example of the hardware configuration of a power management apparatus of the example embodiment.

FIG. 3 is a block diagram illustrating the hardware configuration of the power management apparatus 10 of the example embodiment. As illustrated in FIG. 3, the power management apparatus 10 includes a processor 1A, a memory 2A, an input/output interface 3A, a peripheral circuit 4A, and a bus 5A. In the peripheral circuit 4A, various modules are included. It should be noted that the peripheral circuit 4A may not be provided.

It should be noted that the power management apparatus 10 may be implemented by one apparatus integrated physically and/or logically or may be implemented by a plurality of apparatuses separated physically and/or logically. In the latter case, each of a plurality of apparatuses may have the hardware configuration illustrated in FIG. 3. In addition, a plurality of apparatuses may implement a function of a monitoring system in cooperation.

The bus 5A is a data transmission path through which the processor 1A, the memory 2A, the peripheral circuit 4A, and the input/output interface 3A transmit and receive data with one another. The processor 1A is, for example, an arithmetic processing apparatus, such as a central processing unit (CPU) or a graphics processing unit (GPU). The memory 2A is, for example, a memory, such as a random access memory (RAM) or a read only memory (ROM). The input/output interface 3A includes an input device (example: a keyboard, a mouse, a microphone, and the like), an interface for acquiring information from an external apparatus or an external server, an output device (example: a display, a speaker, a printer, a mailer, and the like), an interface for outputting information to the external apparatus, the external server, and the like. The processor 1A can give a command to each module and can perform an arithmetic operation based on an arithmetic result of the module.

Figure 4:
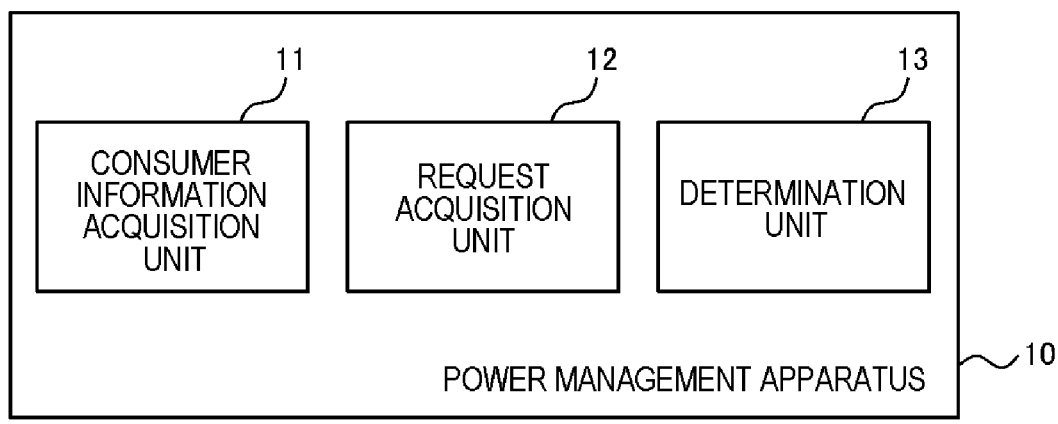
FIG. 4 is an example of a functional block diagram of the power management apparatus of the example embodiment.

Next, a function of the power management apparatus 10 of the example embodiment will be described in detail. FIG. 4 is an example of a functional block diagram of the power management apparatus 10 of the example embodiment. As illustrated in the drawing, the power management apparatus 10 includes a consumer information acquisition unit 11, a request acquisition unit 12, and a determination unit 13.

The request acquisition unit 12 acquires a power consumption request specifying a power amount to be consumed, a time period during which power is consumed, and a power sales price P. The power consumption request is a consumption request from the power producer to the aggregator. For example, the request acquisition unit 12 may receive a power consumption request from an apparatus of the power producer by way of a communication network. In addition, the request acquisition unit 12 may acquire a power consumption request input by an operator of the power management apparatus 10 through the input device. In this case, a power consumption request is delivered from a person in charge of the power producer to a person in charge of the aggregator through any means, such as a telephone, mail, or FAX.

The "power amount to be consumed" included in the power consumption request is a power amount [kWh] that the power producer desires the power consumer to consume or temporal change in power [kW]. For example, the power producer may set a predicted power generation amount [kWh] of its own power generation apparatus in a time period requiring output suppression notified from the power transmission and distribution service provider or a value calculated on the basis of the value of the predicted power generation amount [kWh] (example: a value obtained by multiplying the value of the predicted power generation amount [kWh] by a predetermined coefficient) as the power amount that the power producer has the power consumer consume. In addition, the power producer can set temporal change in power generation prediction [kW] in a time period requiring output suppression notified from the power transmission and distribution service provider or a value (example: value obtained by multiplying the power generation prediction by a predetermined coefficient) calculated on the basis of the power generation prediction as power that the power producer has the power consumer consume. In a case of the temporal change in power, it is possible to calculate an integral value in the time period as the power amount [kWh] that the power producer has the power consumer consume.

The "time period during which power is consumed" included in the power consumption request is a time period during which the power producer desires the power consumer to consume power. The time period during which power is consumed is specified by a start time and an end time (example: 13 o'clock to 15 o'clock). For example, the power producer can set a time period requiring output suppression notified from the power transmission and distribution service provider as the time period during which power is consumed.

The "power amount to be consumed" included in the power consumption request indicates a surplus power amount that is generated exceeding an output upper limit value in the time period requiring output suppression. The "power to be consumed" included in the power consumption request indicates surplus power that is generated exceeding an output upper limit value in the time period requiring output suppression. The "time period during which power is consumed" included in the power consumption request indicates a time period during which surplus power or power amount generated exceeding the output upper limit value in the time period requiring output suppression is consumed.

The "power sales price P" included in the power consumption request is a power sales price of the power producer regarding power consumed by the power consumer according to the power consumption request. The power producer sells, to the power consumer who consumes power according to the power consumption request, power for a consumed amount at the sales price P. The power sales price P is indicated as, for example, a price (unit price) per unit power amount, such as "yen/kWh".

Although a timing at which the request acquisition unit 12 acquires the power consumption request is a matter of design, for example, a power consumption request for a certain day is acquired on the previous day (example: the power consumption request for Nov. 2, 2016 is acquired on Nov. 1, 2016).

The consumer information acquisition unit 11 acquires consumer information corresponding to each of a plurality of power consumers (a plurality of power consumers who make a contract with the aggregator and receives the service of the aggregator). The consumer information includes a power sales price Q of a power retailer selling power to each of a plurality of power consumers, a power demand prediction of each of a plurality of power consumers, and specification information of a power storage system of each of a plurality of power consumers.

The "power sales price Q" included in the consumer information is a power sales price of a power retailer who makes a contract with each power consumer. The power sales price Q is indicated as, for example, a price (unit price) per unit power amount, such as "yen/kWh". The power sales price Q may be a price different for each time period. The consumer information acquisition unit 11 may acquire, for example, a power sales price Q1 of a first time period corresponding to daytime and a power sales price Q2 of a second time period corresponding to nighttime for each power consumer. A start time and an end time of each of the first time period and the second time period are a matter of design.

For example, on the basis of an application content from each of a plurality of consumers, the power management apparatus 10 registers a purchase source (power retailer) in association with each of a plurality of consumers in advance. The power management apparatus 10 acquires the power sales price Q of each of a plurality of power retailers using any means. For example, the power management apparatus 10 may acquire the power sales price Q from a server of each of a plurality of power retailers or may acquire the power sales price Q of each of a plurality of power retailers input by the operator of the power management apparatus 10 through the input device.

The "power demand prediction" included in the consumer information can be calculated using any technique. In the example embodiment, a calculation method of the power demand prediction is not particularly limited. For example, an apparatus on the aggregator side may calculate the power demand prediction of each power consumer, an apparatus on the power consumer side may calculate the power demand prediction corresponding to the power consumer, or an apparatus of a third party may calculate the power demand prediction of each power consumer. The consumer information acquisition unit 11 acquires the power demand prediction calculated by any apparatus.

For example, when the request acquisition unit 12 acquires the power consumption request for the next day on the previous day thereof, the consumer information acquisition unit 11 acquires a power demand prediction for the next day on the previous day thereof. That is, for example, when the request acquisition unit 12 acquires the power consumption request for Nov. 2, 2016 on Nov. 1, 2016, the consumer information acquisition unit 11 acquires the power demand prediction for Nov. 2, 2016 on Nov. 1, 2016.

The "specification information of the power storage system" included in the consumer information includes a rated output [kW] and a rated capacity [kWh] of the power storage system 20. For example, the consumer information acquisition unit 11 may acquire the specification information from the power storage system 20 of each of a plurality of power consumers or may acquire the specification information input by the operator of the power management apparatus 10 through the input device.

The determination unit 13 determines a control content including power consumers caused to consume power according to the power consumption request, a power amount [kWh] or power [kW] to be consumed by each power consumer, and a charging and discharging schedule of the power storage system of each power consumer on the basis of the consumer information and the power consumption request.

Here, processing for determining the control content will be described in detail.

Processing Example 1

A processing example 1 will be described referring to FIG. 5. Here, a case is shown where the power sales price P of the power producer is lower than the power sales price Q1 for the first time period (7 o'clock to 23 o'clock) and the power sales price Q2 for the second time period (23 o'clock to 7 o'clock), and a storage battery is charged to the maximum in the "time period 11 o'clock to 15 o'clock during which power is consumed". It should be noted that a start time and an end time of each time period shown in FIG. 5 are just examples, and the invention is not limited thereto.

Figure 5:
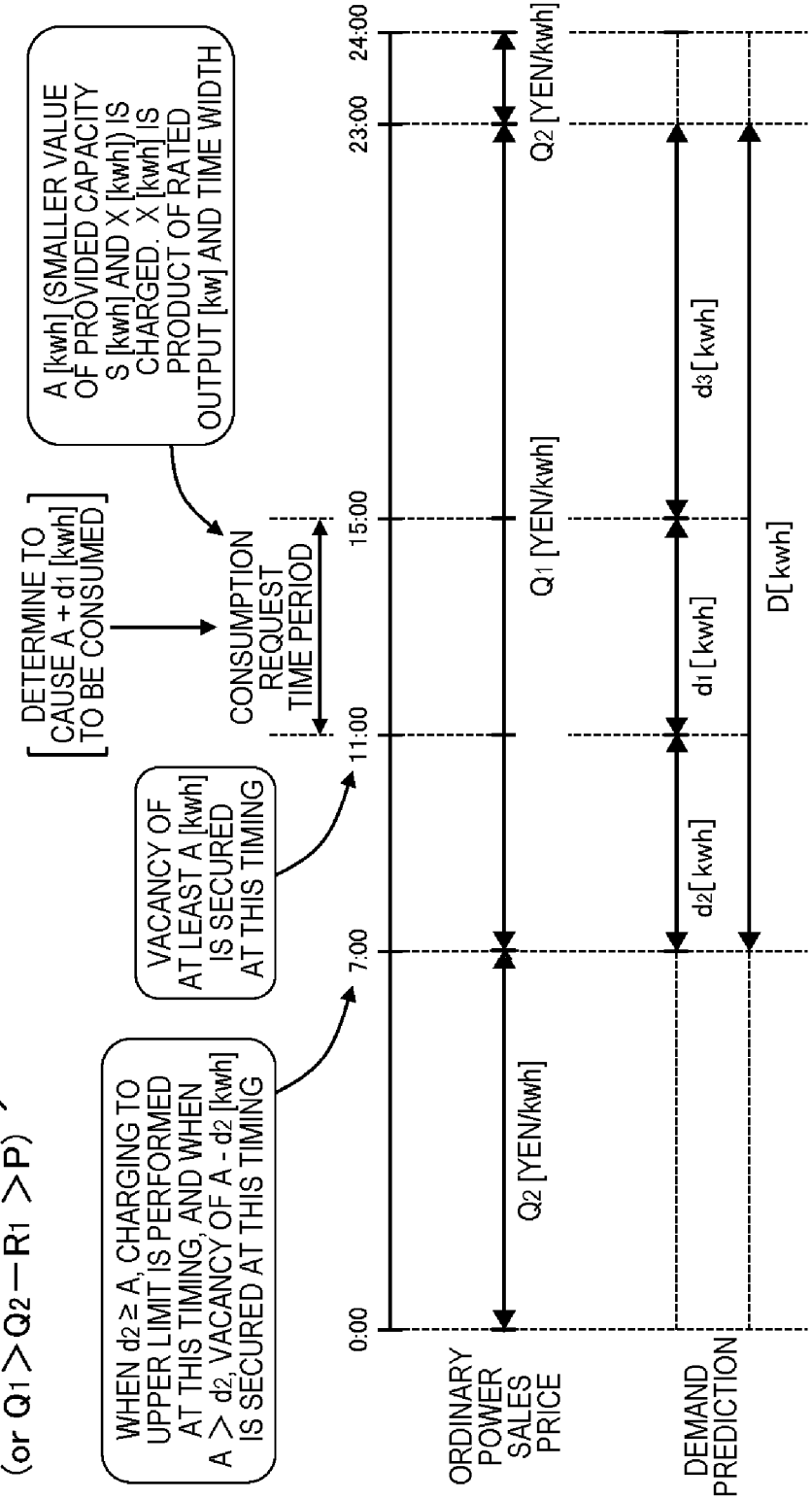
FIG. 5 is a diagram illustrating an example of processing of a determination unit of the example embodiment.

FIG. 5 shows a time schedule on a day when power should be consumed according to the power consumption request. Here, the "time period during which power is consumed" indicated by the power consumption request is set to 11 o'clock to 15 o'clock.

An "ordinary power sales price" shown in the drawing indicates a sales price when each power consumer purchases power from the power retailer. Q1 [yen/kWh] is the power sales price in the first time period (7 o'clock to 23 o'clock). Q2 [yen/kWh] is the power sales price in the second time period (23 o'clock to 7 o'clock). It should be noted that the relationship of Q1>Q2 is established.

A "demand prediction" shown in the drawing indicates a prediction of a demand power amount [kWh] in each time period calculated on the basis of the power demand prediction of the day of each power consumer. d1 [kWh] indicates a prediction of a demand power amount [kWh] in the "time period (11 o'clock to 15 o'clock during which power is consumed)" indicated by the power consumption request. d2 [kWh] indicates a prediction of a demand power amount [kWh] in a time period from a start timing (7 o'clock) of the first time period (7 o'clock to 23 o'clock) until a start timing (11 o'clock) of the "time period (11 o'clock to 15 o'clock) during which power is consumed" indicated by the power consumption request. d3 [kWh] indicates a prediction of a demand power amount [kWh] in a time period from an end timing (15 o'clock) of the "time period (11 o'clock to 15 o'clock) during which power is consumed" indicated by the power consumption request until an end timing (23 o'clock) of the first time period (7 o'clock to 23 o'clock). D [kWh] indicates a prediction of a demand power amount [kWh] in the first time period (7 o'clock to 23 o'clock).

The determination unit 13 can determine a power consumer satisfying a "condition 1: Q2>P" as a power consumer caused to consume power according to the power consumption request.

It should be noted that the consumer information acquisition unit 11 may acquire a participation condition specifying a price difference R1 (R1≥0) from Q2 as consumer information for each power consumer. The determination unit 13 may determine a power consumer satisfying a "condition 1': Q2−R1>P" as a power consumer caused to consume power according to the power consumption request.

When the condition 1 (or the condition 1') is satisfied, that is, when power is purchased from the power producer cheaper than from the power retailer, in consideration of the profit of the power consumer, it is preferable that the power storage system 20 is charged to the maximum in the "time period (11 o'clock to 15 o'clock) during which power is consumed" indicated by the power consumption request.

Thus, the determination unit 13 can determine a smaller value between "a power amount X [kWh] calculated as a product of a rated output [kW] of the power storage system 20 and a time width (in the example of FIG. 5, four hours) of a time period specified by the power consumption request" and "a capacity S [kWh] of the power storage system 20 provided for the service of the aggregator from the power consumer" as a power amount A [kWh] for charging the power storage system 20 of the power consumer in the "time period (11 o'clock to 15 o'clock) during which power is consumed" indicated by the power consumption request. Here, the capacity S [kWh] is a capacity for use in the service under the control of the aggregator in the rated capacity C [kWh] of the power storage system 20. The capacity S [kWh] becomes equal to or less than the rated capacity C [kWh] of the power storage system 20. The consumer information acquisition unit 11 can acquire a value of S [kWh] as a part of the consumer information.

The determination unit 13 can determine a sum of A [kWh] and d1 [kWh] or a value obtained by multiplying the sum by a predetermined coefficient as the power amount [kWh] to be consumed by the power consumer in the "time period (11 o'clock to 15 o'clock) during which power is consumed" indicated by the power consumption request. That is, in the "time period (11 o'clock to 15 o'clock) during which power is consumed", the power storage system 20 is charged with A [kWh], and d1 [kWh] is determined to be consumed by a load or the like.

Next, determination processing of a charging and discharging schedule of the power storage system 20 will be described. The determination unit 13 determines, as a premise, a charging and discharging schedule for charging the power storage system 20 with power in the second time period (23 o'clock to 7 o'clock) and making the power storage system 20 discharge power to consume power in the first time period (7 o'clock to 23 o'clock).

In regard to the power consumer satisfying the condition 1 (or the condition 1'), a charging and discharging schedule for charging power in the "time period (11 o'clock to 15 o'clock) during which power is consumed" indicated by the power consumption request even in the first time period (7 o'clock to 23 o'clock) is determined.

That is, according to a charging and discharging schedule for the first time period (7 o'clock to 23 o'clock) of the next day, the determination unit 13 adjusts a power amount to be charged in the second time period (23 o'clock to 7 o'clock) immediately before the first time period (7 o'clock to 23 o'clock) and performs charging. Furthermore, a charging and discharging schedule for charging in the "time period (11 o'clock to 15 o'clock) during which power is consumed" indicated by the power consumption request in the first time period (7 o'clock to 23 o'clock) and discharging in the other time periods in the first time period (7 o'clock to 23 o'clock) is determined.

The determination unit 13 determines a charging and discharging schedule for causing the power storage system 20 to secure a vacancy of at least A [kWh] at the start timing (11 o'clock) of the "time period (11 o'clock to 15 o'clock) during which power is consumed" indicated by the power consumption request.

Specifically, when A>d2, a charging and discharging schedule for causing the power storage system 20 to secure a vacancy of at least A−d2 [kWh] at the start timing (7 o'clock) of the first time period (7 o'clock to 23 o'clock) is determined. In this case, charging processing in the second time period (23 o'clock to 7 o'clock) is adjusted so as to secure the vacancy.

When d2≥A, a charging and discharging schedule for causing the power storage system 20 to be charged preferably to an upper limit at the start timing (7 o'clock) of the first time period (7 o'clock to 23 o'clock) is determined.

Processing Example 2

A processing example 2 will be described referring to FIGS. 6 and 7. Here, it is assumed that the power sales price P of the power producer is lower than the power sales price Q1 in the first time period (7 o'clock to 23 o'clock), but is higher than the power sales price Q2 in the second time period (23 o'clock to 7 o'clock). FIGS. 6 and 7 show a case where, when demand in the first time period (7 o'clock to 23 o'clock) exceeds power charged in the power storage system 20 in the second time period (23 o'clock to 7 o'clock), the power storage system 20 is charged in the "time period (11 o'clock to 15 o'clock) during which power is consumed" indicated by the power consumption request, or the like. It should be noted that a start time and an end time of each time period shown in FIGS. 6 and 7 are just examples, and the invention is not limited thereto.

Even in the example, the determination unit 13 determines, as a premise, a charging and discharging schedule for causing the power storage system 20 to be charged with power in the second time period (23 o'clock to 7 o'clock) and making the power storage system 20 discharge to consume power in the first time period (7 o'clock to 23 o'clock). In regard to a power consumer satisfying a condition 2 (or the condition 2'), a charging and discharging schedule for charging in the "time period (11 o'clock to 15 o'clock) during which power is consumed" indicated by the power consumption request in the first time period (7 o'clock to 23 o'clock) is determined as needed.

FIG. 6 shows a time schedule on a day when power should be consumed according to the power consumption request. Here, the "time period during which power is consumed" indicated by the power consumption request is set to 11 o'clock to 15 o'clock. An "ordinary power sales price" and a "demand prediction" shown in the drawings are the same as those in the example of FIG. 5.

The determination unit 13 can determine a power consumer satisfying a "condition 2: Q1>P≥Q2 and D>C" as a power consumer caused to consume power according to the power consumption request.

It should be noted that the consumer information acquisition unit 11 may acquire a participation condition specifying a price difference R2 (R2≥0) from Q1 as consumer information for each power consumer. The determination unit 13 may determine a power consumer satisfying a "condition 2': Q1−R2>P≥Q2 and D>C" as the power consumer caused to consume power according to the power consumption request.

When the condition 2 (or the condition 2') is satisfied, that is, when power is purchased from the power retailer in the first time period (7 o'clock to 23 o'clock) higher than from the power producer, but power is purchased from the power retailer in the second time period (23 o'clock to 7 o'clock) cheaper than from the power producer, in consideration of the profit of the power consumer, the condition of D>C becomes significant.

When D>C, that is, when the demand prediction in the first time period (7 o'clock to 23 o'clock) is greater than the rated capacity of the power storage system 20, power charged in the power storage system 20 in the second time period (23 o'clock to 7 o'clock) does not cover the demand in the first time period (7 o'clock to 23 o'clock). Since power is purchased from the power producer cheaper than from the power retailer in the first time period (7 o'clock to 23 o'clock), a power consumer satisfying the condition is determined as the power consumer caused to consume power according to the power consumption request.

When C≥D, that is, when the demand prediction in the first time period (7 o'clock to 23 o'clock) is smaller than the rated capacity of the power storage system 20, power charged in the power storage system 20 in the second time period (23 o'clock to 7 o'clock) covers the demand in the first time period (7 o'clock to 23 o'clock). Accordingly, a power consumer satisfying the condition is not determined as the power consumer caused to consume power according to the power consumption request.

When the condition 2 (or the condition 2') is satisfied, in consideration of the profit of the power consumer, it is preferable to make the power storage system 20 be charged in the "time period (11 o'clock to 15 o'clock) during which power is consumed" indicated by the power consumption request by an amount that power charged in the power storage system 20 in the second time period (23 o'clock to 7 o'clock) does not cover the demand in the first time period (7 o'clock to 23 o'clock).

That is, it is preferable to make the vacancy of the power storage system 20 as large as possible at the end timing (23 o'clock) of the first time period (7 o'clock to 23 o'clock). Therefore, it is preferable to set a charged power amount of the power storage system 20 as a smaller value between d3 and C at the end timing (15 o'clock) of the "time period (11 o'clock to 15 o'clock) during which power is consumed" indicated by the power consumption request. This allows the charge power amount of the power storage system 20 to be 0 at the end timing (23 o'clock) of the first time period (7 o'clock to 23 o'clock). It should be noted that, since Q2 is the cheapest, it is preferable to make the power storage system 20 be charged to the upper limit at the start timing (7 o'clock) of the first time period (7 o'clock to 23 o'clock). Furthermore, it is preferable to minimize an amount of power to be purchased in the first time period (7 o'clock to 23 o'clock) at the unit price Q1.

With the above, the determination unit 13 determines a charging and discharging schedule of the power storage system 20 as shown in FIG. 7.

First, a charging and discharging schedule for causing the power storage system 20 to be charged to the upper limit (SOC=100%) at the start timing (7 o'clock) of the first time period (7 o'clock to 23 o'clock) is determined.

In such a case, a charged power amount M [kWh] of the power storage system 20 at the start timing (11 o'clock) of the "time period (11 o'clock to 15 o'clock) during which power is consumed" indicated by the power consumption request becomes C−d2 [kWh] when C>d2, and becomes 0 when d2≥C.

When M=0, that is, when the charged power amount is completely consumed before the "time period (11 o'clock to 15 o'clock) during which power is consumed" is started, the determination unit 13 can determine a charging and discharging schedule for causing the power storage system 20 of the power consumer satisfying the condition 2 or the condition 2' to be charged with a smallest power amount among d3, S, and X in the "time period (11 o'clock to 15 o'clock) during which power is consumed" indicated by the power consumption request.

d3 [kWh] indicates a prediction of a demand power amount [kWh] in a time period from the end timing (15 o'clock) of the "time period (11 o'clock to 15 o'clock) during which power is consumed" indicated by the power consumption request until the end timing (23 o'clock) of the first time period (7 o'clock to 23 o'clock). S [kWh] is a capacity of the power storage system 20 provided for the service of the aggregator from the power consumer. X [kWh] is a product of the rated output [kW] of the power storage system 20 and the time width (in the example of FIG. 5, four hours) of the "time period (11 o'clock to 15 o'clock) during which power is consumed" indicated by the power consumption request.

When the charging and discharging schedule of the power storage system 20 is determined in this way, it is possible to minimize a purchased power amount at the unit price Q1 while suppressing a purchased power amount, unneeded for meeting D, based on the power consumption request in the first time period (7 o'clock to 23 o'clock).

When M=0, the determination unit 13 can determine a smallest power amount among d1+d3, d1+S, and d1+X or a value obtained by multiplying the smallest power amount by a predetermined coefficient as power to be consumed by the power consumer satisfying the condition 2 or the condition 2' in the "time period (11 o'clock to 15 o'clock) during which power is consumed" indicated by the power consumption request.

When M=C−d2 (provided that, C>d2) and M>d3, this indicates a situation in which, at a time when the "time period (11 o'clock to 15 o'clock) during which power is consumed" starts, a storage battery of a consumer has a charged power amount for an amount meeting d3, but cannot meet its own power consumption amount in the "time period (11 o'clock to 15 o'clock) during which power is consumed". At this time, it is desirable that its own consumption d1 in the "time period (11 o'clock to 15 o'clock) during which power is consumed" is supplied through discharging from the storage battery and power purchase based on the power consumption request.

Specifically, the determination unit 13 can determine a charging and discharging schedule for causing the power storage system 20 of the power consumer satisfying the condition 2 or the condition 2' to discharge (C−d2)−d3 in the "time period (11 o'clock to 15 o'clock) during which power is consumed" indicated by the power consumption request.

When the charging and discharging schedule of the power storage system 20 is determined in this way, it is possible to minimize a purchased power amount at the unit price Q1 while suppressing a purchased power amount, unneeded for meeting D, based on the power consumption request in the first time period (7 o'clock to 23 o'clock).

When M=C−d2 (provided that, C>d2) and M>d3, the determination unit 13 can determine d1−((C−d2)−d3), that is, D−C or a value obtained by multiplying the d1−((C−d2)−d3) by a predetermined coefficient as power to be consumed by the power consumer satisfying the condition 2 or the condition 2' in the "time period (11 o'clock to 15 o'clock) during which power is consumed" indicated by the power consumption request. d1−((C−d2)−d3) is obtained by subtracting, from the demand prediction of the power consumer in the "time period (11 o'clock to 15 o'clock) during which power is consumed" indicated by the power consumption request, a power amount to be discharged from the power storage system 20 in the time period.

When M=C−d2 (provided that, C>d2) and d3≥M, that is, when a charged power amount at the start timing of the "time period (11 o'clock to 15 o'clock) during which power is consumed" is not enough to meet d3, it is desirable to determine an amount not covered with M in d3 as a power amount to be charged. For this reason, the determination unit 13 can determine a charging and discharging schedule for causing the power storage system 20 of the power consumer satisfying the condition 2 or the condition 2' to be charged with a smallest power amount among d3−(C−d2), d2, and X in the "time period (11 o'clock to 15 o'clock) during which power is consumed" indicated by the power consumption request. It should be noted that, when the charged power amount of the power storage system 20 does not cover d3 even though the power storage system 20 is charged according to the charging and discharging schedule, power consumption of a load or the like is performed with power from a power system in 15 o'clock to 23 o'clock.

d3−(C−d2) [kWh] is the same as d3−M [kWh]. That is, d3−(C−d2) [kWh] is obtained by subtracting the charged power amount M of the power storage system 20 at the start timing (11 o'clock) of the "time period (11 o'clock to 15 o'clock) during which power is consumed" indicated by the power consumption request from the prediction of the demand power amount [kWh] in the time period from the end timing (15 o'clock) of the "time period (11 o'clock to 15 o'clock) during which power is consumed" indicated by the power consumption request until the end timing (23 o'clock) of the first time period (7 o'clock to 23 o'clock).

d2 [kWh] indicates a prediction of a demand power amount [kWh] in a time period from the start timing (7 o'clock) of the first time period (7 o'clock to 23 o'clock) until the start timing (11 o'clock) of the "time period (11 o'clock to 15 o'clock) during which power is consumed" indicated by the power consumption request. Since the power storage system 20 is charged to the maximum at the start timing (7 o'clock) of the first time period (7 o'clock to 23 o'clock), when C>d2, d2 becomes a vacant capacity of the power storage system 20 at the start timing (11 o'clock) of the "time period (11 o'clock to 15 o'clock) during which power is consumed" indicated by the power consumption request.

X [kWh] is a product of the rated output [kW] of the power storage system 20 and the time width (in the example of FIG. 5, four hours) of the "time period (11 o'clock to 15 o'clock) during which power is consumed" indicated by the power consumption request.

When M=C−d2 (provided that, C>d2) and d3≥M, the determination unit 13 can determine a smallest power amount among D−C, d1+d2, and d1+X or a value obtained by multiplying the smallest power amount by a predetermined coefficient as power to be consumed by the power consumer satisfying the condition 2 or the condition 2'.

Processing Example 3

The determination unit 13 may determine both of a power consumer satisfying the condition 1 (or the condition 1') and a power consumer satisfying the condition 2 (or the condition 2') as a power consumer caused to consume power according to the power consumption request. A determination method of the power amount to be consumed or the charging and discharging schedule of the power storage system 20 is the same as in the processing examples 1 and 2.

Here, when a total of power amounts determined to be consumed by power consumers according to the power consumption request does not satisfy a power amount specified by the power consumption request, the determination unit 13 may notify a transmission source (power producer)

of the power consumption request of the effect through electronic mail or the like. In such a case, the determination unit 13 may notify the power producer of an insufficient amount [kWh] for a power amount specified by the power consumption request or an amount [kWh] that can be consumed at the specified power sales price P. The determination unit 13 may request the power producer for a new power sales price P.

Further, when the total of the power amounts determined to be consumed by the power consumers according to the power consumption request does not satisfy the power amount specified by the power consumption request, the determination unit 13 may calculate a power sales price P exceeding the power amount specified by the power consumption request and may notify the transmission source of the effect. For example, the determination unit 13 may calculate a maximum value of the power sales prices P exceeding the power amount specified by the power consumption request and may notify the transmission source of the maximum value. In regard to a calculation method, for example, the maximum value can be calculated by performing a simulation in any one of the processing examples 1 to 3 while changing the value of the power sales price P.

Further, when the total of the power amounts determined to be consumed by the power consumers according to the power consumption request exceeds the power amount specified by the power consumption request, the determination unit 13 can allocate the power amount specified by the power consumption request to a plurality of power consumers determined to consume power according to the power consumption request. For example, the determination unit 13 may divide the power amount (kWh) specified by the power consumption request on the basis of the ratio of "values of power amounts (kWh) to be consumed according to the power consumption request" determined corresponding to the power consumers.

It should be noted that, with the above-described allocation, when the value of the power amount (kWh) to be consumed by each power consumer according to the power consumption request becomes smaller than a value determined by the methods of the processing examples 1 to 3, the charging and discharging schedule of the power storage system 20 may be adjusted such that the power amount to be charged in the power storage system 20 is reduced as much.

Figure 8:
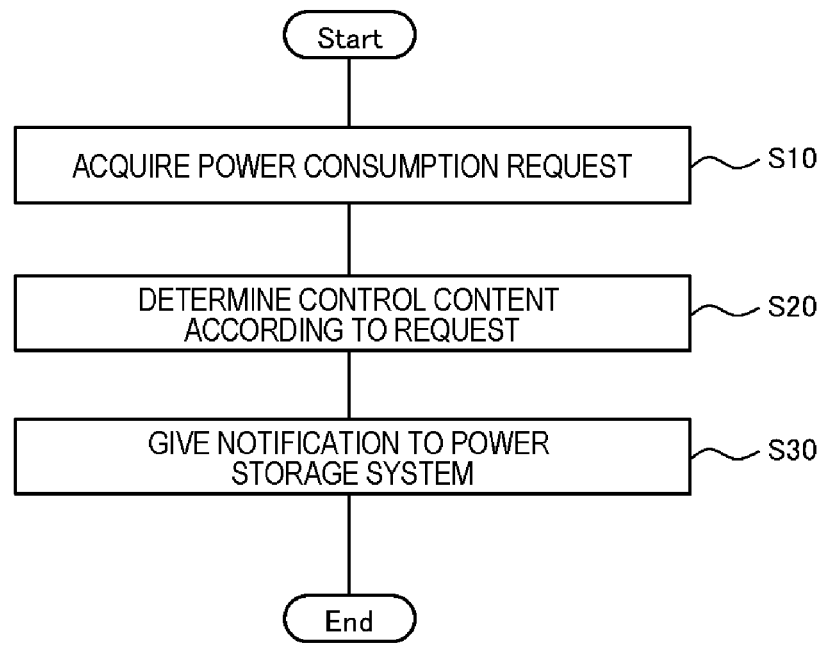
FIG. 8 is a flowchart illustrating an example of a flow of processing of the power management apparatus of the example embodiment.

Next, an example of a flow of processing of the power management apparatus 10 will be described referring to a flowchart of FIG. 8.

First, the request acquisition unit 12 acquires the power consumption request specifying the power amount to be consumed, the time period during which power is consumed, and the power sales price P (S10).

Next, the determination unit 13 determines the power consumers caused to consume power according to the power consumption request, the power amount to be consumed by each power consumer, and the charging and discharging schedule of the power storage system 20 of each power consumer on the basis of the power consumption request acquired in S10 (S20).

Then, the determination unit 13 notifies each power consumer of the determined control content (S30). For example, the determination unit 13 may notify each power consumer of the determined control content through mail or the like. Further, the determination unit 13 may notify the power storage system 20 of each power consumer of the determined charging and discharging schedule of the power storage system 20. The power storage system 20 performs the charging and discharging operation according to the notified charging and discharging schedule.

Next, advantageous effects of the example embodiment will be described. With the power management apparatus 10 of the example embodiment, it is possible to determine the control contents of the power consumers including the power consumer caused to consume power according to the power consumption request, the power amount to be consumed by each power consumer, and the charging and discharging schedule of the power storage system of each power consumer on the basis of the power consumption request including the power sales price P, the power sales price Q of the power retailer selling power to the power consumers, the power demand prediction of each power consumer, and the specification information of the power storage system 20 of each power consumer.

That is, it is possible to determine the above-described control contents so as to bring the power consumers maximum profit on the basis of the magnitude relationship between the power sales price P and the power sales price Q, the relationship between the demand prediction and the rated capacity of the power storage system 20, or the like.

In this way, with the power management apparatus 10 capable of determining the control contents of the power consumers in consideration of the profit of the power consumers, it is possible to increase the number of power consumers who make a contract with the aggregator and receive the service. As a result, the aggregator can smoothly operate the service.

When the power amount specified by the power consumption request cannot be consumed at the power sales price P specified by the power consumption request, the power management apparatus 10 of the example embodiment can notify the power producer of the effect. At this time, the power management apparatus 10 can notify the power producer of an insufficient amount [kWh] for the power amount specified by the power consumption request, an amount [kWh] that can be consumed at the specified power sales price P, a request for a new power sales price P, or the like. The power producer can perform the review or the like of the power sales price P or a power generation plan on the basis of the notification.

When the power amount specified by the power consumption request cannot be consumed at the power sales price P specified by the power consumption request, the power management apparatus 10 of the example embodiment can calculate a power sales price P at which the power amount can be consumed and can notify the power producer of the power sales price P. The power producer can easily perform the review or the like of the power sales price P on the basis of the notification.

Hereinafter, examples of reference embodiments will be added below.

1. A power management apparatus including a request acquisition unit that acquires a power consumption request specifying a power amount to be consumed, a time period during which power is consumed, and a power sales price P, a consumer information acquisition unit that acquires consumer information including a power sales price for each time period of a power retailer selling power to each of a plurality of power consumers and specification information of a power storage system of each of the plurality of power consumers, and a determination unit that determines a charging and discharging schedule of the power storage system of each power consumer on the basis of the consumer information and the power consumption request.

2. The power management apparatus according to 1,
in which the consumer information acquisition unit acquires, as the power sales price for each time period, a power sales price Q1 for a first time period and a power sales price Q2 for a second time period, and Q1>Q2, and
the determination unit determines a power consumer satisfying a "condition 1: Q2>P" as a power consumer caused to consume power according to the power consumption request.

3. The power management apparatus according to 2,
in which the consumer information acquisition unit acquires a participation condition specifying a price difference R1 (provided that, R1≥0) from Q2 for each power consumer, and
the determination unit determines a power consumer satisfying a "condition 1': Q2−R1>P" as a power consumer caused to consume power according to the power consumption request.

4. The power management apparatus according to 2 or 3,
in which, when a product of a rated output of a power storage system and a time width of a time period specified by the power consumption request is X, and a capacity of the power storage system provided from a power consumer is S,
the determination unit determines a smaller value between S and X as a power amount A for charging a power storage system of a power consumer satisfying the condition 1 or the condition 1'.

5. The power management apparatus according to 4,
in which, when a prediction of a demand power amount of a power consumer in the time period specified by the power consumption request is d1,
the determination unit determines a sum of A and d1 as a power amount to be consumed by the power consumer satisfying the condition 1 or the condition 1'.

6. The power management apparatus according to 4 or 5,
in which the determination unit determines, as a charging and discharging schedule of the power storage system of the power consumer satisfying the condition 1 or the condition 1', a charging and discharging schedule for securing a vacancy of at least A by a start timing of the time period specified by the power consumption request.

7. The power management apparatus according to 6,
in which the time period specified by the power consumption request is included in the first time period, and
when a prediction of a demand power amount of a power consumer from a start timing of the first time period until the start timing of the time period specified by the power consumption request is d2,
the determination unit determines, as the charging and discharging schedule of the power storage system of the power consumer satisfying the condition 1 or the condition 1', a charging and discharging schedule for causing the power storage system to be charged to an upper limit at the start timing of the first time period when d2≥A and causing the power storage system to secure a vacancy of at least A−d2 at the start timing of the first time period when A>d2.

8. The power management apparatus according to any one of 1 to 7,
in which the consumer information acquisition unit acquires, as the power sales price for each time period, a power sales price Q1 for a first time period and a power sales price Q2 for a second time period, and Q1>Q2, and
when a rated capacity of a power storage system is C, and a prediction of a demand power amount of a power consumer in the first time period is D,
the determination unit determines a power consumer satisfying a "condition 2: Q1>P≥Q2 and D>C" as a power consumer caused to consume power according to the power consumption request.

9. The power management apparatus according to 8,
in which the consumer information acquisition unit acquires a participation condition specifying a price difference R2 (provided that, R2≥0) from Q1 for each power consumer, and
the determination unit determines a power consumer satisfying a "condition 2': Q1−R2>P≥Q2 and D>C" as the power consumer caused to consume power according to the power consumption request.

10. The power management apparatus according to 8 or 9,
in which a time period specified by the power consumption request is included in the first time period, and
when a prediction of a demand power amount of a power consumer in the time period specified by the power consumption request is d1,
a prediction of a demand power amount of the power consumer from a start timing of the first time period until a start timing of the time period specified by the power consumption request is d2,
a prediction of a demand power amount of the power consumer from an end timing of the time period specified by the power consumption request until an end timing of the first time period is d3,
a charged power amount of a power storage system at the start timing of the time period specified by the power consumption request is M,
a product of a rated output of the power storage system and a time width of the time period specified by the power consumption request is X, and
a capacity of the power storage system provided from the power consumer is S,
the determination unit determines a charging and discharging schedule for causing the power storage system to be charged to an upper limit at the start timing of the first time period and determines, as power to be consumed by the power consumer satisfying the condition 2 or the condition 2',
a smallest power amount among d1+d3, d1+S, and d1+X when M=0,
D−C when M=C−d2 (provided that, C>d2) and M>d3, and
a smallest power amount among D−C, d1+d2, and d1+X when M=C−d2 (provided that, C>d2) and d3≥M.

11. The power management apparatus according to 10,
in which the determination unit determines a charging and discharging schedule for causing a power storage system of the power consumer satisfying the condition 2 or the condition 2' to be charged with a smallest power amount among d3, S, and X in the time period specified by the power consumption request when M=0.

12. The power management apparatus according to 10 or 11,
in which the determination unit determines a charging and discharging schedule for causing a power storage system of the power consumer satisfying the condition 2 or the condition 2' to discharge (C−d2)−d3 in the time period specified by the power consumption request when M=C−d2 and M>d3.

13. The power management apparatus according to any one of 10 to 12,
in which the determination unit determines a charging and discharging schedule for causing a power storage system of the power consumer satisfying the condition 2 or the condition 2' to be charged with a smallest power amount among d3−(C−d2), d2, and X in the time period specified by the power consumption request when M=C−d2 and d3≥M.

14. The power management apparatus according to any one of 10 to 13, in which the determination unit determines, as a charging and discharging schedule of a power storage system of the power consumer satisfying the condition 2 or the condition 2', a charging and discharging schedule for setting the charged power amount of the power storage system as a smaller value between C and d3 at the end timing of the time period specified by the power consumption request.

15. The power management apparatus according to any one of 1 to 14, in which, when a total of power amounts determined to be consumed by power consumers according to the power consumption request is less than a power amount specified by the power consumption request, the determination unit notifies a transmission source of the power consumption request of the effect.

16. The power management apparatus according to 15, in which, when the total of the power amounts determined to be consumed by the power consumers according to the power consumption request is less than the power amount specified by the power consumption request, the determination unit requests the transmission source for a new power sales price P.

17. The power management apparatus according to 15 or 16, in which, when the total of the power amounts determined to be consumed by the power consumers according to the power consumption request is less than the power amount specified by the power consumption request, the determination unit calculates a power sales price P exceeding the power amount specified by the power consumption request and notifies the transmission source of the power sales price P.

18. A power management system including the power management apparatus according to any one of 1 to 17, and a power storage system that operates on the basis of an instruction from the power management apparatus.

19. A power management method executed by a computer the method including:

a request acquisition step of acquiring a power consumption request specifying a power amount to be consumed, a time period during which power is consumed, and a power sales price P, a consumer information acquisition step of acquiring consumer information including a power sales price for each time period of a power retailer selling power to each of a plurality of power consumers and specification information of a power storage system of each of the plurality of power consumers, and a determination step of determining a charging and discharging schedule of the power storage system of each power consumer on the basis of the consumer information and the power consumption request.

20. A program causing a computer to function as a request acquisition unit that acquires a power consumption request specifying a power amount to be consumed, a time period during which power is consumed, and a power sales price P, a consumer information acquisition unit that acquires consumer information including a power sales price for each time period of a power retailer selling power to each of a plurality of power consumers and specification information of a power storage system of each of the plurality of power consumers, and a determination unit that determines a charging and discharging schedule of the power storage system of each power consumer on the basis of the consumer information and the power consumption request.

This application claims priority based on Japanese Patent Application No. 2016-235849 filed on Dec. 5, 2016, the entire disclosure of which is incorporated herein by reference.

The invention claimed is:

1. A power management apparatus comprising:
at least one memory configured to store one or more instructions; and
at least one processor configured to execute the one or more instructions to:
acquire a power consumption request specifying a power amount to be consumed, a time period during which power is consumed, and a power sales price P;
acquire consumer information including a power sales price for each time period of a power retailer selling power to each of a plurality of power consumers and specification information of a power storage system of each of the plurality of power consumers, wherein the consumer information includes a prediction D of a demand power of each of the plurality of power consumers and a rated capacity of the power storage system; and
determine whether the power consumption request is accommodated for each power consumer on the basis of the consumer information and the power consumption request and determine a charging and discharging schedule of the power storage system for each power consumer on the basis of a determination content and the power sales price for each time period of the power retailer, the charging and discharging schedule defining a time period in which power is charged and a time period in which power is discharged.

2. The power management apparatus according to claim 1, wherein the processor is further configured to execute the one or more programs to:
acquire, as the power sales price for each time period, a power sales price Q1 for a first time period and a power sales price Q2 for a second time period, and Q1>Q2, and
determine a power consumer satisfying a "condition 1: Q2>P" as a power consumer caused to consume power according to the power consumption request.

3. The power management apparatus according to claim 2, wherein the processor is further configured to execute the one or more programs to:
acquire participation condition specifying a price difference R1 (provided that, R1≥0) from Q2 for each power consumer, and
determine a power consumer satisfying a "condition 1': Q2−R1>P" as a power consumer caused to consume power according to the power consumption request.

4. The power management apparatus according to claim 2,
wherein, when a product of a rated output of the power storage system and a time width of a time period specified by the power consumption request is X, and a capacity of the power storage system provided from a power consumer is S,
the processor is further configured to execute the one or more programs to determine a smaller value between S and X as a power amount A for charging the power storage system of a power consumer satisfying the condition 1.

5. The power management apparatus according to claim 4,
wherein, when a prediction of a demand power amount of a power consumer in the time period specified by the power consumption request is d1,
the processor is further configured to execute the one or more programs to determine a sum of A and d1 as a power amount to be consumed by the power consumer satisfying the condition 1.

6. The power management apparatus according to claim 4, wherein the processor is further configured to execute the one or more programs to determine, as a charging and discharging schedule of the power storage system of the power consumer satisfying the condition 1, a charging and discharging schedule for securing a vacancy of at least A by a start timing of the time period specified by the power consumption request.

7. The power management apparatus according to claim 6,
wherein the time period specified by the power consumption request is included in the first time period, and
when a prediction of a demand power amount of the power consumer satisfying the condition 1 from a start timing of the first time period until the start timing of the time period specified by the power consumption request is d2,
the processor is further configured to execute the one or more programs to determine, as the charging and discharging schedule of the power storage system of the power consumer satisfying the condition 1, a charging and discharging schedule for causing the power storage system to be charged to an upper limit at the start timing of the first time period when $d2 \geq A$ and causing the power storage system to secure a vacancy of at least $A-d2$ at the start timing of the first time period when $A > d2$.

8. The power management apparatus according to claim 1, wherein the processor is further configured to execute the one or more programs to:
acquire, as the power sales price for each time period, a power sales price Q1 for a first time period and a power sales price Q2 for a second time period, and Q1>Q2, and
determine a power consumer satisfying a "condition 2: $Q1 > P \geq Q2$ and $D > C$" as a power consumer caused to consume power according to the power consumption request when a rated capacity of the power storage system is C, and a prediction of a demand power amount of the power consumer in the first time period is D.

9. The power management apparatus according to claim 8, wherein the processor is further configured to execute the one or more programs to:
acquire a participation condition specifying a price difference R2 (provided that, $R2 \geq 0$) from Q1 for each power consumer, and
determine a power consumer satisfying a "condition 2': $Q1 - R2 > P \geq Q2$ and $D > C$" as the power consumer caused to consume power according to the power consumption request.

10. The power management apparatus according to claim 8,
wherein the time period specified by the power consumption request is included in the first time period, and
when a prediction of a demand power amount of the power consumer satisfying the condition 2 in the time period specified by the power consumption request is d1,
a prediction of a demand power amount of the power consumer from a start timing of the first time period until a start timing of the time period specified by the power consumption request is d2,
a prediction of a demand power amount of the power consumer from an end timing of the time period specified by the power consumption request until an end timing of the first time period is d3,
a charged power amount of the power storage system of the power consumer satisfying the condition 2 at the start timing of the time period specified by the power consumption request is M,
a product of a rated output of the power storage system of the power consumer satisfying the condition 2 and a time width of the time period specified by the power consumption request is X, and
a capacity of the power storage system of the power consumer satisfying the condition 2 provided from the power consumer is S,
the processor is further configured to execute the one or more programs to determine a charging and discharging schedule for causing the power storage system of the power consumer satisfying the condition 2 to be charged to an upper limit at the start timing of the first time period and determine, as power to be consumed by the power consumer satisfying the condition 2,
a smallest power amount among $d1+d3$, $d1+S$, and $d1+X$ when $M=0$,
$D-C$ when $M=C-d2$ (provided that, $C>d2$) and $M>d3$, and
a smallest power amount among $D-C$, $d1+d2$, and $d1+X$ when $M=C-d2$ (provided that, $C>d2$) and $d3 \geq M$.

11. The power management apparatus according to claim 10,
wherein the processor is further configured to execute the one or more programs to determine a charging and discharging schedule for causing the power storage system of the power consumer satisfying the condition 2 to be charged with a smallest power amount among d3, S, and X in the time period specified by the power consumption request when $M=0$.

12. The power management apparatus according to claim 10,
wherein the processor is further configured to execute the one or more programs to determine a charging and discharging schedule for causing the power storage system of the power consumer satisfying the condition 2 to discharge $(C-d2)-d3$ in the time period specified by the power consumption request when $M=C-d2$ and $M>d3$.

13. The power management apparatus according to claim 10,
wherein the processor is further configured to execute the one or more programs to determine a charging and discharging schedule for causing the power storage system of the power consumer satisfying the condition 2 to be charged with a smallest power amount among $d3-(C-d2)$, d2, and X in the time period specified by the power consumption request when $M=C-d2$ and $d3 \geq M$.

14. The power management apparatus according to claim 10, wherein the processor is further configured to execute the one or more programs to determine, as a charging and discharging schedule of the power storage system of the power consumer satisfying the condition 2, a charging and discharging schedule for setting the charged power amount of the power storage system as a smaller value between C and d3 at the end timing of the time period specified by the power consumption request.

15. The power management apparatus according to claim 1,
wherein, when a total of power amounts determined to be consumed by power consumers according to the power consumption request is less than the power amount specified by the power consumption request, the processor is further configured to execute the one or more programs to notify a transmission source of the power consumption request of the effect.

16. The power management apparatus according to claim 15,
wherein, when the total of the power amounts determined to be consumed by the power consumers according to the power consumption request is less than the power amount specified by the power consumption request, the processor is further configured to execute the one or more programs to request the transmission source for a new power sales price P.

17. The power management apparatus according to claim 15,
wherein, when the total of the power amounts determined to be consumed by the power consumers according to the power consumption request is less than the power amount specified by the power consumption request, the processor is further configured to execute the one or more programs to calculate a second power sales price P for the power amount that is not determined to be consumed by the power consumers and notify the transmission source of the power sales price P.

18. A power management system comprising:
the power management apparatus according to claim 1; and
the power storage system that operates on the basis of an instruction from the power management apparatus.

19. A power management method executed by a computer the method comprising:
acquiring a power consumption request specifying a power amount to be consumed, a time period during which power is consumed, and a power sales price P;
acquiring consumer information including a power sales price for each time period of a power retailer selling power to each of a plurality of power consumers and specification information of a power storage system of each of the plurality of power consumers, wherein the consumer information includes a prediction D of a demand power of each of the plurality of power consumers and a rated capacity of the power storage system; and
determining whether the power consumption request is accommodated for each power consumer on the basis of the consumer information and the power consumption request and determining a charging and discharging schedule of the power storage system for each power consumer on the basis of a determination content and the power sales price for each time period of the power retailer, the charging and discharging schedule defining a time period in which power is charged and a time period in which power is discharged.

20. A non-transitory storage medium storing a program causing a computer to:
acquire a power consumption request specifying a power amount to be consumed, a time period during which power is consumed, and a power sales price P;
acquire consumer information including a power sales price for each time period of a power retailer selling power to each of a plurality of power consumers and specification information of a power storage system of each of the plurality of power consumers, wherein the consumer information includes a prediction D of a demand power of each of the plurality of power consumers and a rated capacity of the power storage system; and
determine whether the power consumption request is accommodated for each power consumer on the basis of the consumer information and the power consumption request and determine a charging and discharging schedule of the power storage system for each power consumer on the basis of a determination content and the power sales price for each time period of the power retailer, the charging and discharging schedule defining a time period in which power is charged and a time period in which power is discharged.

* * * * *